United States Patent [19]

Hammerslag

[11] 3,949,609
[45] Apr. 13, 1976

[54] RESISTANCE THERMOMETER AND DISPOSABLE PROBE

[76] Inventor: Julius G. Hammerslag, 1626 Galaxy Drive, Newport Beach, Calif. 92660

[22] Filed: Apr. 28, 1975

[21] Appl. No.: 572,117

Related U.S. Application Data

[63] Continuation of Ser. No. 222,264, Jan. 31, 1972, abandoned.

[52] U.S. Cl. .............................. 73/362 AR; 338/28
[51] Int. Cl.² ........................................... G01K 7/24
[58] Field of Search .................. 73/362 AR; 338/28

[56] References Cited
UNITED STATES PATENTS

| | | | |
|---|---|---|---|
| 2,611,836 | 9/1952 | Crawford | 200/61.58 R |
| 3,431,781 | 3/1969 | Wiggin | 73/362 AR |
| 3,469,449 | 9/1969 | Keller | 73/362 AR |
| 3,485,102 | 12/1969 | Glick | 73/362 AR |
| 3,535,935 | 10/1970 | Raudszus | 73/362 AR |
| 3,550,448 | 12/1970 | Ensign | 73/362 AR X |
| 3,570,313 | 3/1971 | Frank et al. | 73/362 AR |
| 3,681,991 | 8/1972 | Eberly | 73/362 AR |

Primary Examiner—Richard C. Queisser
Assistant Examiner—Frederick Shoon
Attorney, Agent, or Firm—Newton H. Lee, Jr.

[57] ABSTRACT

A battery operated thermometer by which a person's temperature is measured by a thermistor which varies the current flow through a resistance bridge circuit, and the temperature is shown by adjusting a dial to adjust a meter to a null point. A quick connector is employed to connect the disposable probe in the bridge circuit. The probe consists of a pair of conductor wires in an insulating sheath and having bared ends held by pressure only in conductive contact with a thermistor chip by a plastic tip which shrinks to press the bared ends against the chip.

10 Claims, 6 Drawing Figures

U.S. Patent   April 13, 1976   Sheet 1 of 2   3,949,609
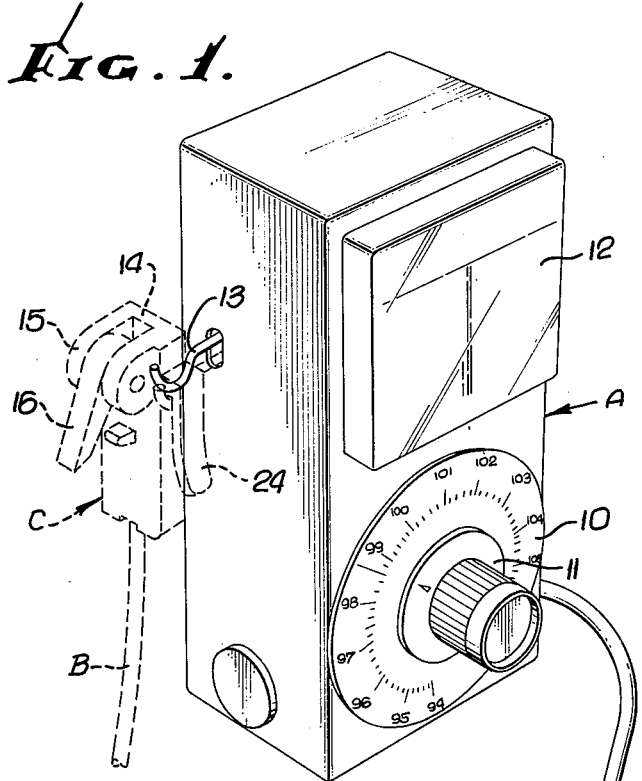
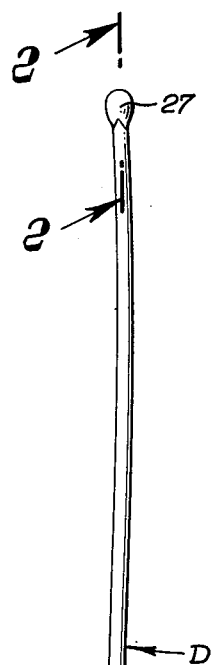
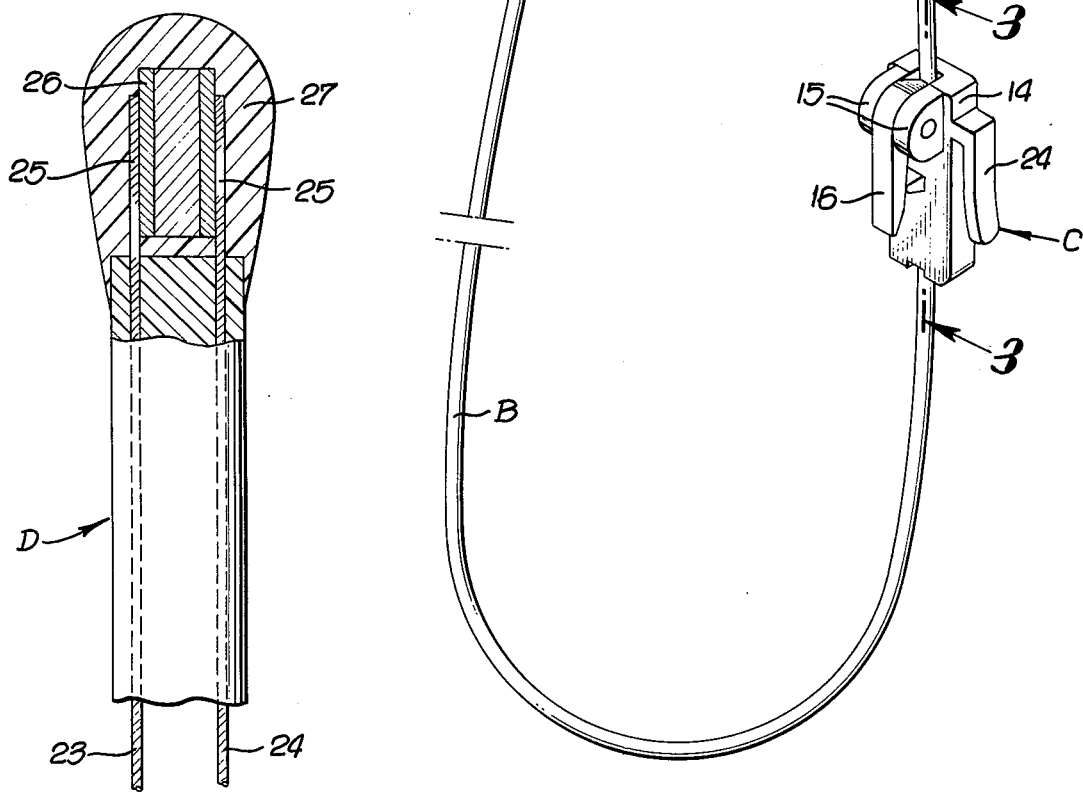

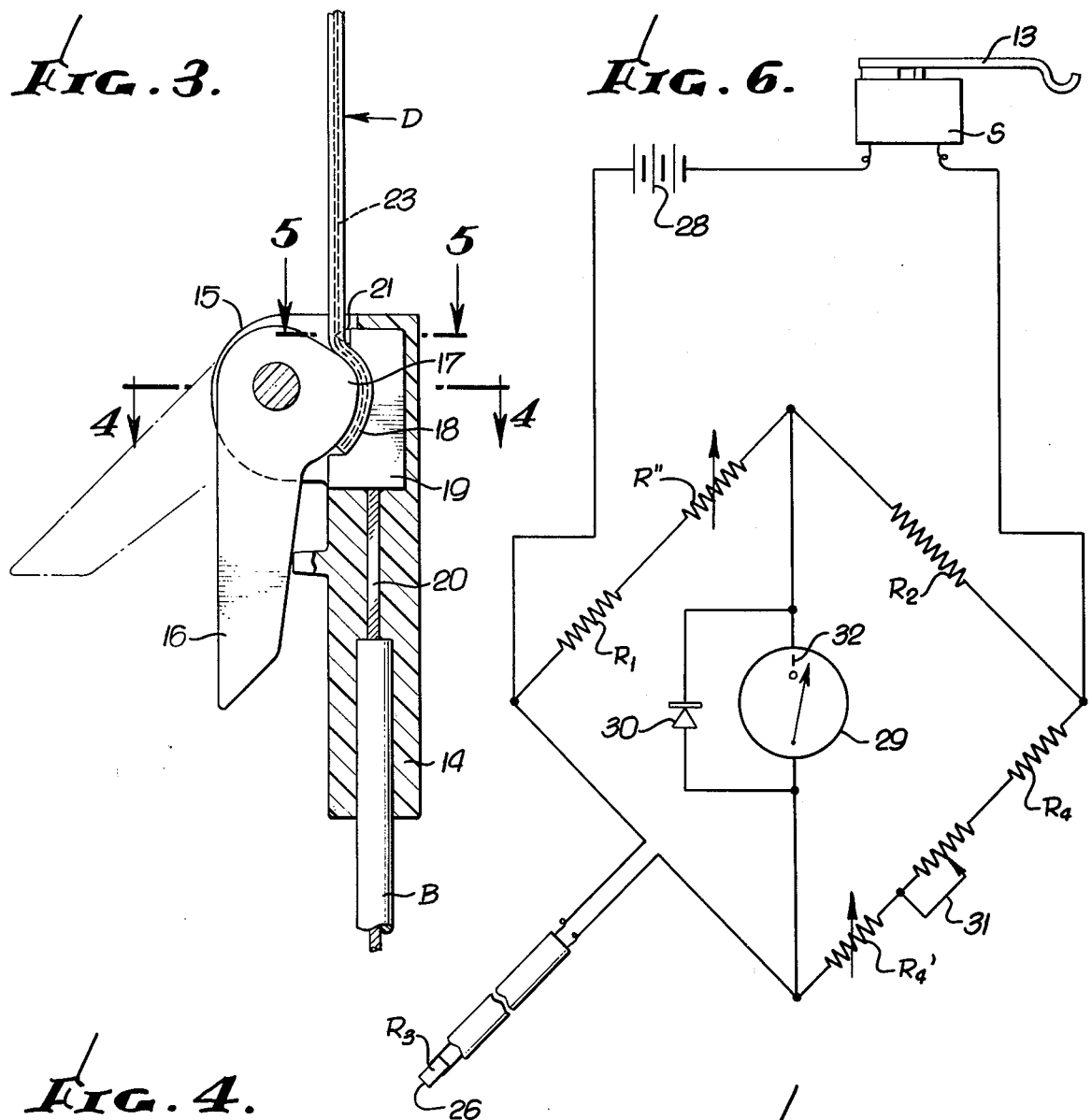
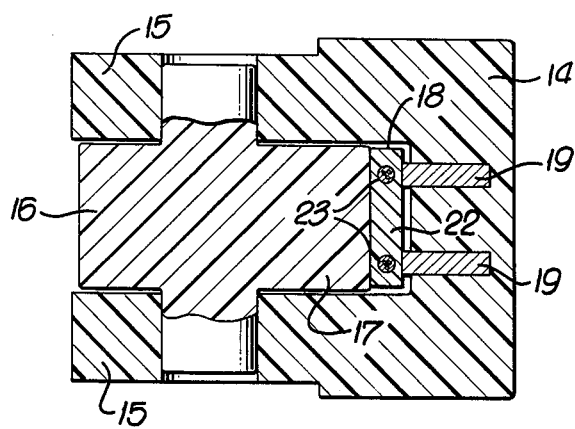

RESISTANCE THERMOMETER AND DISPOSABLE PROBE

CROSS REFERENCE TO RELATED APPLICATION

This application is a continuation of my application Ser. No. 222,264, filed Jan. 31, 1972, for Resistance Thermometer and Disposable Probe which is now abandoned.

BACKGROUND OF THE INVENTION

The typical fever thermometer employed in institutions, such as hospitals, and by doctors, as well as in homes, is fragile, expensive, time consuming to use and requires sterilization for reuse. Yet, large number of such thermometers are employed daily, particularly in the case of institutions where a large number of patients may require that an attendant individually take the patient's temperature several times a day, with resultant substantial investment in thermometers, consumption of time, and cost of sterilization, as well as in some cases, the hazard of breakage. In practice, the usual thermometer is inserted beneath the tongue and requires a substantial period of time for the mercury or other fluid to expand, and the reading of the temperature, particularly in poor light, is very difficult, so that inevitably, it will frequently occur that an erroneous temperature reading will be made While electrically operated thermometers are in existance, they are in general erratic and the sensing elements expensive. More particularly, the known electrical thermometers function on the principle involving measuring current flow which varies with the resistance of the sensing element, but the current source and the meters also constitute variables rendering such thermometers inaccurate, particularly, when the source is a battery which is subject to progressive deterioration, so that even an expensive meter cannot accurately indicate temperature.

SUMMARY OF THE INVENTION

The present invention provides an electrical thermometer wherein a resistance bridge circuit is connected with a sensing probe including a thermistor which varies the current flow through the bridge circuit, and wherein the current flow is nulled by a potentiometer and the null point shown on a null meter, the actual temperature being shown on a calibrated dial by a pointer rotated when adjusting the nulling potentiometer.

Such an electrical thermometer is not only fast, but safer than the usual glass thermometer since there is no possibility of breakage, mercury poisoning, or transmission of infection, and is substantially more convenient and simple to use.

The invention is further advantageous as compared with other electrical thermometers in terms of accuracy and dependability, in that the electrical system is operable independently of battery charge over the entire voltage range, and is accurate over the entire life of the battery. In addition, the sensing system is not dependent upon the accuracy of the meter since only the null is significant. The present thermometer maintains for later recording a visual indication of the temperature on the graduated dial, so that the person taking the temperature need not, at that moment, record it or remember it.

In accordance with a feature of the invention, the sensing element or probe is so constructed that it is inexpensive and therefor disposable. To facilitate use of the probe, a quick acting electrical connector is employed to engage and make contact with the conductor wires of the probe. The sensing element of the probe is a thermal responsive solid resistor element or thermistor chip, and contact between the conductor wires and the opposite sides of the chip is accomplished by pressure only, thereby avoiding the use of solder and the resultant variation in the resistivity. To accomplish this, the bared ends of the wire conductors are held in pressure contact with the thermistor by a sheath of plastic material, such as an epoxy material, shrunk in place to maintain the contact pressure and seal the connections to prevent corrosion. Such probes can be very inexpensively manufactured and stored in sterile sheaths or receptacles.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

BRIEF DESCRIPTION OF THE DRAWINGS

FIG. 1 is a perspective of an electrical thermometer made in accordance with the invention, showing the probe in place and ready for use, and, in broken lines, showing the connector in a storage position;

FIG. 2 is an enlarged detail view of the end of the probe and in section along the line 2—2 of FIG. 1;

FIG. 3 is an enlarged, fragmentary detail view, in section, as taken on the line 3—3 of FIG. 1, showing the quick connector for the probe;

FIG. 4 is a detail view in section, as taken on the line 4—4 of FIG. 3;

FIG. 5 is a detail view in section, as taken on the line 5—5 of FIG. 3; and

FIG. 6 is a system diagram showing the bridge circuit and probe.

DESCRIPTION OF THE PREFERRED EMBODIMENT

As seen in the drawings, the thermometer of the invention includes a case or unit A, adapted to be disposed in a convenient location, say for example, mounted on a wall adjacent to a hospital bed. Extending from the case A is an electrical conductor cable B of a convenient length, having a quick connector C at its free end for connecting to the conductor cable and end of a probe D. The unit A has a dial face 10 calibrated in degrees of temperature and a dial 11 angularly adjustable to indicate a particular temperature, during use of the thermometer, determined by reference to a null meter within the unit and visible through a transparent cover 12. Projecting from a side of the unit A is a suitable support 13 for the connector C which is, in the illustrative embodiment, a switch arm, as will be later described.

The connector C may be of any desired type for making a quick and convenient connection with an end of the probe. In the illustrated case, the connector is a conventional type, having a body 14 having a pair of ears 15 pivotally supporting a cam lever 16 having an eccentric portion 17 adapted upon rotation of the lever from the broken line position of FIG. 3 to the full line position, to clamp the insulated end portion 18 of the probe D against a pair of spaced contact plates 19 which are conductively connected to the wires 20 of the cable B, the plates having knife portions 21 which pierce the insulation 22 of the probe, as seen in FIG. 5, and make electrical contact with the spaced conductor wires 23. At one side of the connector body 14 is a suitable hook 24, by which the conductor may be hung on the support arm 13.

Referring to FIG. 2, the sensing end of the probe is illustrated. As shown, the probe conductor wires 23 have end portions 25 which are bared of insulation and are in conductive contact with the sides of a typical thermistor chip 26 consisting of a thermistor oxide center with fused metal and glass side walls. Such chips are inexpensive and can be selected so as to have a uniform negative temperature coefficient, so that all probes will be similar in their thermal response.

In order to avoid the change or drift in the temperature coefficient of the chip which occurs due to metal migration during soldering of the conductor lead ends to the chip, means are provided whereby the conductive contact between the lead ends 25 and the chip 26 is maintained by pressure only, without soldering. This is accomplished by applying a plastic end 27 to the probe having the characteristic of shrinking as it cures, such as certain epoxy materials, the end 27 not only encapsulating the chip and the bared wires, but also extending about the insulating material to form a complete seal.

Referring to FIG. 6, a schematic of a preferred electrical system is shown. In this form, the support arm 13 for the connector C is a typical pivoted arm of a switch S which is normally on, but which is turned off by the weight of the connector C. The switch S is in circuit with a storage battery 28 which may be of the inexpensive, low voltage type used for transistor radios and the like, adapted to be quickly exchanged when necessary. However, as will become apparent hereinafter, the battery will have a long useful life, since the system is not sensitive to the magnitude of the battery voltage, and will operate effectively over the entire span.

The battery is connected to a meter 29 by a Wheatstone bridge comprising resistances $R^1$ and $R^2$, in a connected pair of first and second arms of the bridge circuit, which may be of known resistance, but which for economy may be of random resistance, the ratio of which is varied as necessary by a variable resistance $R''$, in one of the connected arms, to compensate for changes in total resistance in the circuit. The resistance $R^3$ connected in an arm of the bridge circuit is the resistance to be measured, i.e., the thermistor 26, and the resistance $R^4$ and the variable resistance $R^{4'}$ are employed in a third arm of the circuit connected between the arm containing the resistor $R^2$ and the arm connected to the thermistor 26 to trim or calibrate the circuit to a point on the dial. Preferably, a diode 30 is employed to prevent overload of the meter. The use of the trimming resistances $R''$ and $R^{4'}$ permits the circuit to include relatively inexpensive, non-precision components.

The meter 29, connected between junctions of the first, second, and third arms of the circuit, will indicate the current determined by the variation of the thermistor caused by temperature, and a potentiometer 31 driven by the dial 11 is employed to equalize the resistance or null the current, so that the meter can be read with reference to a null mark 32.

It will now be understood that in use, an attendant may simply take from a convenient supply one of the probes D and insert the one end into the connector, so that the thermometer is ready. When the probe is inserted into the patient's mouth, for example, the response time of the thermistor is quite rapid, say 15 seconds, but usually other activities will enable the probe to remain in the patient's mouth for a longer period, say for 1 minute, while the pulse is taken. The dial 11 is then rotated until the null is reached as indicated by reference to the scale 10. The probe is then removed from the connector and, preferably, disposed of. When the connector is again hung on the switch arm 13, the system will be truned off.

It is now apparent that the invention provides a simple, accurate, safe, and inexpensive means for taking the temperature of patients by the use of an inexpensive disposable probe.

I claim:

1. An electrical thermometer comprising: a conductor probe having a thermister, a null meter, a resistance bridge circuit connecting said thermistor to said meter, a dial, and a variable potentiometer in said bridge circuit operable by said dial to null the meter, connector means releasably connecting said probe in said bridge circuit, said probe having leads connected with said thermistor and encased in an insulating sheath, and said connector means having contact means for piercing said sheath, said contact means being connected to said bridge circuit.

2. A thermally responsive probe for electrical thermometers, comprising: an insulating sheath having a pair of conductor wires, said wires having adjacent ends extending from said sheath, a thermistor chip between said wire ends, and pressure applying means maintaining said wire ends in conductive contact with said chip by pressure only.

3. A thermally responsive probe as defined in claim 2, wherein said pressure applying means comprises a thermoconductive tip encapsulating said chip and said wire ends.

4. A thermally responsive probe as defined in claim 3, wherein said pressure applying means comprises a plastic tip shrunk onto said chip and said wire ends.

5. A thermally responsive probe as defined in claim 4, wherein said plastic tip is composed of an epoxy material cured on said chip and said wire ends.

6. An electrical thermometer comprising: a meter, a resistance bridge circuit connected to said meter, a variable resistance in said bridge circuit, a dial face calibrated in degrees of temperature, a dial for adjusting said variable resistance to indicate a temperature on said dial face, and connector means including conductor means connectable to a thermally responsive probe to vary the current to said meter, said connector means including means for piercing the insulating sheath of a thermally responsive probe to establish electrical connection therebetween.

7. An electrical thermometer comprising: a conductor probe having a thermistor therein, electrically operated temperature indicating circuit means for indicating a temperature determined by the resistance of said thermistor, connector means releasably connecting said probe in said circuit means, said probe having leads connected with said thermistor and encased in an insulating sheath, and said connector means having contact means for piercing said sheath, said contact means being connected to said circuit means.

8. An electrical thermometer as defined in claim 7, wherein said leads comprise a pair of wires having adjacent ends projecting from said sheath, said thermistor being disposed between said wire ends, and including pressure applying means maintaining said wire ends in conductive contact with said thermistor by pressure only.

9. An electrical thermometer comprising in combination: a temperature responsive probe having an insulating sheath and a pair of wires therein, temperature indicating means including an electrical circuit, and connector means including conductor means connected with said circuit, and means for piercing the insulating sheath of said probe to establish electrical connection between said wires and said conductor means.

10. An electrical thermometer comprising: indicator means, including a circuit indicating temperature determined by a thermal responsive probe, and connector means connectable to the thermal responsive probe, said connector means including means for piercing an insulating sheath of the probe to establish electrical connection between said circuit and the probe.

* * * * *